United States Patent [19]

Oguchi et al.

[11] Patent Number: 4,565,726

[45] Date of Patent: Jan. 21, 1986

[54] MAGNETIC RECORDING MEDIA HAVING FERROMAGNETIC AND FERRITE PARTICLES IN THE MAGNETIC LAYER THEREOF

[75] Inventors: Toshihiko Oguchi, Atsugi; Hirohisa Kato, Ebina; Moriyasu Wada, Ninomiya; Toshimitsu Asano, Yokohama, all of Japan

[73] Assignee: Tokyo Shibaura Denki Kabushiki Kaisha, Kawasaki, Japan

[21] Appl. No.: 488,759

[22] Filed: Apr. 26, 1983

[30] Foreign Application Priority Data

May 24, 1982 [JP] Japan .................................. 57-86425

[51] Int. Cl.$^4$ ................................. G11B 5/68
[52] U.S. Cl. .................... 428/328; 428/329; 428/330; 428/694; 428/900; 252/62.63
[58] Field of Search ............... 428/694, 695, 900, 328, 428/329, 330; 252/62.54, 62.63

[56] References Cited

U.S. PATENT DOCUMENTS

| | | |
|---|---|---|
| 3,023,166 | 2/1962 | Duinker et al. |
| 3,677,947 | 7/1972 | Ray et al. ........................ 252/62.54 |
| 3,687,725 | 8/1972 | Hartmann et al. ............... 252/62.54 |
| 3,740,266 | 6/1973 | Akashi et al. ...................... 428/328 |
| 4,075,672 | 2/1978 | Manly ................................. 428/900 |
| 4,108,786 | 8/1978 | Takayama ........................ 252/62.54 |
| 4,239,637 | 12/1980 | Naruse .............................. 252/62.54 |
| 4,281,043 | 7/1981 | Deffeyes ............................ 428/694 |
| 4,323,621 | 4/1982 | Kobe et al. ......................... 428/329 |
| 4,363,850 | 12/1982 | Yasui et al. ....................... 428/900 |
| 4,364,988 | 12/1982 | Andoh et al. ..................... 428/212 |
| 4,425,401 | 1/1984 | Ido et al. ............................ 428/694 |
| 4,442,159 | 4/1984 | Dezawa et al. ................... 428/900 |

FOREIGN PATENT DOCUMENTS

| | | |
|---|---|---|
| 55-86103 | 12/1978 | Japan . |
| 55-84041 | 6/1980 | Japan . |
| 55-125538 | 9/1980 | Japan . |
| 212623 | 12/1982 | Japan ............................... 428/323 |

*Primary Examiner*—George F. Lesmes
*Assistant Examiner*—William M. Atkinson
*Attorney, Agent, or Firm*—Schwartz, Jeffery, Schwaab, Mack, Blumenthal & Evans

[57] ABSTRACT

Disclosed is a magnetic recording medium, characterized in that 5 to 100 parts by weight of hexagonal ferrite particles having an average particle diameter of 0.01 to 0.2 μm and 100 parts by weight of ferromagnetic particles having a saturation magnetization of 72 to 220 emu/g and an average particle diameter larger than that of the hexagonal ferrite particles are dispersed in a resinous binder.

9 Claims, No Drawings

MAGNETIC RECORDING MEDIA HAVING FERROMAGNETIC AND FERRITE PARTICLES IN THE MAGNETIC LAYER THEREOF

BACKGROUND OF THE INVENTION

This invention relates to magnetic recording media, and more specifically to magnetic recording media suitable for use in high-density recording.

Needle-like $\gamma$-$Fe_2O_3$ has conventionally been employed most extensively in magnetic recording media. However, due to the low coercive force (iHc) of $\gamma$-$Fe_2O_3$ which generally ranges from 300 to 350 Oe, it has been impossible to increase the recording density using 65 -$Fe_2O_3$ alone.

In view of the circumstance, it has been attempted to increase the iHc of acicular $\gamma$-$Fe_2O_3$ particles to about 700 Oe or so by applying Co on the surface of the $\gamma$-$Fe_2O_3$ particles prior to their use. Even in this attempt, it is infeasible to increase the iHc beyond the above-mentioned level.

Meanwhile, so-called metallic tapes have been known, which are prepared by dispersing fine particles of magnetic iron powder in a resinous binder and coating the thus-prepared coating formulation onto surfaes of substrates. They have the a merit that they permit magnetic recordings of higher density than conventional magnetic iron oxide, $\gamma$-$Fe_2O_3$, but, on the other hand, they are not only difficult to handle because they undergo ready oxidation by oxygen present in the air and have an extremely high potential danger of explosion in the course of preparing the magnetic iron powder or magnetic coating formulation, but they are also accompanied with a drawback that their characteristics as magnetic recording media have poor long-term stability.

Furthermore, it has recently been attempted to prepare coating formulations using $\gamma$-$Fe_2O_3$, the particle lengths of which $\gamma$-$Fe_2O_3$ have been shortened as much as feasible, and applying such coating formulations onto substrates to provide magnetic recording media of high density.

However, as the particle lengths of needle-like ferromagnetic particles are shortened, a limitation will appear as to reproduction output in the high-frequency region and their electromagnetic characteristics in the low-frequency region will be deteriorate because of the influence of demagnetizing fields, leading to another problem that the usable frequency region will be narrowed down.

With a view toward solving these problems, the present inventors have already proposed a high-density magnetic recording medium in which ferromagnetic particles such as needle-like $\gamma$-$Fe_2O_3$ particles or Co-coated $\gamma$-$Fe_2O_3$ particles and fine magentic particles of the Ba-ferrite type are both contained at predetermined proportions (see, Japanese Unexamined Pat. Publication No. 212623/1982, published Dec. 27, 1982). In the above proposal, each piece of the fine magnetic particles of the Ba-ferrite type serves as a minute recording element capable of functioning as a magnet of a single magnetic domain, and, besides, its iHc is as high as 600 to 2,000 Oe, thereby making high-density magnetic recording feasible.

A subsequent investigation by the present inventors has, however, found that, since fine magnetic particles of the Ba-ferrite type are crystals of hexagonal plate-like configurations and have easy axes of magnetization in directions vertical to their planes, the fine particles tend to agglomerate one over another because of a magnetic attraction produced between each plate-like particle and its adjacent plate-like paticle. This means that, when fine magnetic paticles of the Ba-ferrite type are dispersed together with $\gamma$-$Fe_2O_3$ particles in a resinous binder upon preparation of a magnetic coating formulation, the dispersion may not always be uniform and may thus lack stability and, when applied on substrates, the non-uniformity of the dispersion may inconveniently affect deleteriously high-density magnetic recording and, in addition, become a cause for deteriorated anti-noise characteristics.

SUMMARY OF THE INVENTION

An object of this invention is to provide a magnetic recording medium capable of exhibiting high reproduction outputs over the entire frequency range from the audio wave range to the video wave range and permitting high-density magnetic recording.

The present inventors have carried out intensive research to solve the above-described problems which appear upon using fine magnetic particles of the Ba-ferrite type. As a result, it has been found that the mutual agglomeration of the fine particles may be avoidable by making the particle diameters of ferromagnetic particles such as $\gamma$-$Fe_2O_3$, which are also contained together with the fine particles, larger than the particle diameters of the fine particles. Although the reason for this effect has not been elucidated, it is presumed that the fine magnetic particles of the Ba-ferrite type are magnetically stuck on the ferromagnetic particles such as $\gamma$-$Fe_2O_3$,present together, at surfaces of the hexagonal plates of the former particles, in other words, at planes containing easy axes of magnetization and their mutual agglomeration is thus suppressed. In addition, it has also been found at the same time that, in the above case, the recording density of a magnetic recording medium is governed by its fine magnetic particles of the Ba-ferrite type. Accordingly, the present inventors have come to a concept that high-density magnetic recording may be feasible and magnetic recording media having excellent anti-noise characteristics may be obtained even if the fine magnetic particles of the Ba-ferrite type are proportioned in a small amount so long as they are dispersed uniformly, leading to the completion of this invention.

Namely, a magnetic recording medium according to this invention is characterized in that 5 to 100 parts by weight of hexagonal ferrite particles having an average particle diameter of 0.01 to 0.2 $\mu$m and 100 parts by weight of ferromagnetic particles having a saturation magnetization of 70 to 220 emu/g and an average particle diameter larger than that of the hexagonal ferrite particles are dispersed in a re sinous binder.

DETAILED DESCRIPTION OF PREFERRED EMBODIMENTS

Hexagonal ferrites useful in the practice of this invention, include Ba-ferrite, Sr-ferrite, Ca-ferrite, Pb-ferrite, and substituted Ba-ferrites represented by the following formula:

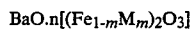

$$BaO.n[(Fe_{1-m}M_m)_2O_3]$$

(wherein, M means at least one element selected from the group consisting of Co, Ti, Zn, Ni, Mn, In, Cu, Ge and Nb, and m and n stand respectively for values of 0 to 0.2 and 5.4 to 6.0), and the like. In the present invention, Ba-ferrite is preferably used owing to its large iHc.

The average particle diameter of hexagonal ferrite governs the recording density of a magnetic recording medium to be obtained. The smaller its average particle size, the more advantageous. The value of the average particle size is limited to 0.01 to 0.2 μm, and preferably to 0.05 to 0.15 μm. Any average particle sizes over 0.2 μm are not preferred as they are disadvantageous for the fabrication of high-density magnetic recording media.

The average particle size of hexagonal ferrite herein used is determined by measuring diagonals on the surfaces of hexagonal plates of the particles, each of the particles having a diameter d and thickness t in the range of d : t = 2 : 1 to 8 : 1.

It is necessary for the hexagonal ferrite particles to be used in this invention to have an iHc of from 600 to 2,000 Oe, preferably of from 700 to 1500 Oe. Such hexagonal ferrite particles may be prepared in the following manner: First, an aqueous solution containing necessary metallic elements at predetermined ionconcentrations, the pH of which solution has been adjusted, is held for example at 150° to 250° C. and for 20 minutes to 2 hours to cause all the elements to co-precipitate into a precursor of an intended hexagonal ferrite of a predetermined composition. The precursor has the same composition and particle diameter as the intended crystalline particles but its crystals are absolutely incomplete and, regarding its magnetic characteristics, both iHc and saturation magnetization (Ms) are very small.

Thereafter, the precursor of the hexagonal ferrite obtained above is washed with water and dried, and then baked for example at temperatures of from 700° to 950° C. and for about 1 hour. During this baking step, it is preferable to agitate the material under the baking treatment (i.e., powder particles) so that it may be kept in a floating state. Thus, it is suitable to conduct the baking step in a rotary kiln or fluidized bed. In the course of the baking, the presursor of the hexagonal ferrite is converted into crystals of complete hexagonal plate-like configurations, thereby providing hexagonal, fine crystalline, ferrite particles having a narrow particle size distribution. The particle diameters of hexagonal ferrite particles may be controlled to 0.01 to 0.2 μm by suitably adjusting the pH, the preparation temperature of the precursor in an autoclave and the baking temperature in the above-described preparation process.

The iHc value of the hexagonal ferrite particle may be selected optionally by controlling the kind and amount of the element represented by M of the above-mentioned compositional formula.

Exemplary ferromagnetic particles useful in the practice of this invention, include Fe, Ni, Co and Cr as their sole components, particles of alloys made of two or more of Fe, Ni, Co and Cr; magnetite particles, γ-ferrite particles; and Co-modified magnetite particles, Co-modified γ-ferrite particles. Of these ferromagnetic particles, metallic particles consisting principally of γ-ferrite or Fe is suitable.

These ferromagnetic particles are each required to have a saturation magnetization of 70 to 220 emu/g, and preferably 75 to 150 emu/g. Any saturation magnetizations smaller than 70 emu/g are not preferred because resulting magnetic recording media will have lowered reproduction outputs in the low frequency region. They are also required to have an iHc value of from 300 to 2000 Oe.

The average particle diameter of such ferromagnetic particles is required to be greater than that of hexagonal ferrite particles present together with the ferromagnetic particles. If the average particle diameter of the ferromagnetic particles should be smaller than that of hexagonal ferrite particles, the uniformity of dispersion of the hexagonal ferrite particles may not be improved upon preparation of a magnetic coating formulation. The average particle diameter of such ferromagnetic particles is controlled generally within the range of 0.05 to 1.0 μm, and preferably with the range of 0.1 to 0.7 μm.

These ferromagnetic particles are usually acicular, and accordingly the average particle diameter thereof is indicated by measuring the length of the longitudinal demension of the particles.

The magnetic recording medium according to this invenion may be fabricated as follows. Namely, predetermined amounts of the above-described hexagonal ferrite particles and ferromagnetic particles are first charged in a dispersing and mixing machine such as, for example, a sand grinder pot. Here, it is necessary that they are proportioned at a ratio of 5 to 100 parts by weight, and preferably 10 to 50 parts by weight of the hexagonal ferrite particles to 100 parts by weight of the ferromagnetic particles.

If the hexagonal ferrite particles should be added in an amount less than 5 parts by weight, features inherent to the hexagonal ferrite particles will not appear in a magnetic recording medium to be fabricated, the effects of the hexagonal ferrite particles will not be exhibited and the magnetic recording medium shows only the characteristics of the ferromagnetic particles. On the other hand, any contents of the hexagonal ferrite particles exceeding 100 parts by weight will reduce the effects of the ferromagnetic particles to a significant extent, thereby resulting in smaller reproduction output in the low frequency region. It is thus unsuitable to use the hexagonal ferrite particles beyond 100 parts by weight.

After incorporating additionally an anti-static conductive material such as carbon black and a resinous binder in predetermined amounts, the mixing machine is operated to prepare a magnetic coating formulation. The thus-obtained magnetic coating formulation is coated onto a substrate (e.g., a polyester film), pressed and smoothened using methods well known in the art, thereby fabricating magnetic recording medium according to this invention.

This invention will be described in greater detail by the following Examples:

EXAMPLE 1

Mixed were 25 parts by weight of hexagonal ferrite particles having an average particle diameter of 0.1 μm, iHc of 900 Oe and a composition of $BaO.6[(Fe_{2-2x}Co_x Ti_x)_2-O_3]$, wherein x=0.14, and 75 parts by weight of γ-ferrite particles as ferromagnetic particles having an average particle diameter of 0.5 um and an iHc of 330 Oe. The resultant mixture was charged into a sand grinder pot and, subsequent to further charging of 4 parts by weight of lecithin, 3 parts of carbon black, and 200 parts by weight of a mixed methyl ethyl ketone-toluene solution (mixing ratio =1:1) containing 12 parts by weight of VAGH (trade name, a vinyl chloride-vinyl acetate copolymer, product of Union Carbide Corporation) and 12 parts by weight of N-3022 (trade name, a urethane elastomer, product of Nippon Polyurethane Co., Ltd.), the sand grinder pot was operated so as to subject the contents to a dispersing treatment for 5 hours. The resultant magnetic coating formulation was then added with 3 parts by weight of Colonate L (trade name, a TDI-type hardener, product of Nippon Polyurethane Co., Ltd.). It was then caused to pass successively through filters of 10 $\mu$m, 5 $\mu$m, 3 $\mu$m and 1 $\mu$m. Finally, it was coated onto a polyester film by means of reverse coater. The coated surface was pressed and then subjected to a smoothening processing using hot calender rolls, thereby fabricating a magnetic recording medium. This magnetic recording medium was designated as Sample No. 1.

Another magnetic recording medium was fabricated in the same manner as Sample 1 except that Co-coated $\gamma$-ferrite particles having an average particle diameter of 0.4 $\mu$m and an iHc of 750 Oe were used as ferromagnetic particles in place of $\gamma$-ferrite particles. This second magnetic recording medium was designated as Sample No. 2.

A further magnetic recording medium was fabricated in the same manner as Sample 1 except that the ferromagnetic particles were magnetic particles having an average particle diameter of 0.5 $\mu$m and an iHc of 300 Oe. It was designated as Sample No. 3.

A still further magnetic recording medium was fabricated in the same manner as Sample 1 except that the ferromagnetic particles were iron particles having an average particle diameter of 0.2 $\mu$m and an iHc of 1200 Oe. It was designated as Sample No. 4.

A still further magnetic recording medium was fabricated in the same manner as Sample 1 except that the hexagonal ferrite particles were Ba-ferrite particles having an average particle diameter of 0.07 $\mu$m and an iHc of 2000 Oe. It was designated as Sample No. 5.

The procedure employed in the fabrication of Sample No. 1 was followed except that the amount of $\gamma$-ferrite particles was increased from 75 parts by weight to 100 parts by weight without using the hexagonal ferrite particles. The resultant magnetic recording medium was designated as Sample No. 6.

A still further magnetic recording medium was fabricated in the same manner as Sample No. 1 except that, in lieu of the $\gamma$-ferrite particles, 100 parts by weight of Co-coated $\gamma$-ferrite particles having an average particle diameter of 0.4 $\mu$m and an iHc of 750 Oe were used. It was designated as Sample No. 7.

A still further magnetic recording medium was fabricated in the same manner as Sample No. 1 except that, in place of the particles represented by BaO.6[(Fe$_{2-2x}$Co$_x$Ti$_x$)$_2$O$_3$], wherein x =0.14, 100 parts by weight of magnetic particles having an average particle diameter of 0.5 $\mu$m and an iHc of 350 Oe were used. It was designated as Sample No. 8.

A procedure similar to that employed in the fabrication of Sample No. 1 except that the large ferromagnetic particles were not employed but the amount of the particles represented by BaO .6[(Fe$_{2-x}$Co$_x$Ti$_x$)$_2$O$_3$], wherein x=0.14, was increased from parts by weight to 100 parts by weight, was to fabricate a still further magnetic recording medium was. It was designated as Sample No. 9.

With respect to the above 9 kinds of samples, reproduction output characteristics and anti-noise characteristics were measured. The values of reproduction outputs given in Table 1 are relative values as calculated using the magnetic recording medium made singly of Ba-ferrite particles having an average particle diameter of 0.1 $\mu$m (Sample No. 9) as a standard.

TABLE 1

| Sample No. | Recording/reproducing outputs | | Noise (dB) |
|---|---|---|---|
| | High frequency region (recorded wavelength, 0.6 $\mu$m) | Low frequency region (recorded wavelength, 5 $\mu$m) | |
| (Example 1) | | | |
| No. 1 | +1.0 | +0.5 | −0.5 |
| No. 2 | +2.5 | +1.0 | −0.5 |
| No. 3 | +1.5 | +0.5 | 0 |
| No. 4 | +5.0 | +3.0 | +1.0 |
| No. 5 | −1.0 | 0 | 0 |
| (Comparative Example) | | | |
| No. 6 | −12.0 | +2.5 | +2.5 |
| No. 7 | −6.0 | +2.5 | +2.0 |
| No. 8 | −11.5 | +3 | +3 |
| No. 9 | 0 | 0 | 0 |

EXAMPLE 2

Ba-ferrite particles having an average particle diameter of 0.1 $\mu$m and iHc of 900 Oe and iron particle having an average particle diameter of 0.2 $\mu$m and an iHc of 1200 Oe were provided respectively as hexagonal ferrite particles and as ferromagnetic particles. They were mixed in proportions respectively given in Table 2 and magnetic recording media bearing the Ba-ferrite particles and iron particles in different proportions were fabricated in the same manner as Sample No. 1 of Example 1. With respect to these magnetic recording media, reproduction output and anti-nose characteristics were measured. Measurement results are also given in Table 2. Incidentally, the values of reproduction output have the same significance as that defined in Example 1.

TABLE 2

| Sample No. | Iron particles (parts by weight) | Ba—ferrite (parts by weight) | Recording/reproducing outputs | | Noise (dB) |
|---|---|---|---|---|---|
| | | | High frequency region (recorded wavelength, 0.6 $\mu$m) | Low frequency region (recorded wavelength, 5 $\mu$m) | |
| (Comparative Example) | | | | | |
| No. 10 | 99 | 1 | 0 | +3.0 | +2.5 |
| (Example 2) | | | | | |
| No. 11 | 93 | 7 | +1.5 | +3.0 | +2.0 |
| No. 12 | 80 | 20 | +3.0 | +3.0 | +1.0 |
| No. 13 | 70 | 30 | +5.0 | +3.0 | +0.5 |
| No. 14 | 60 | 40 | +3.5 | +2.5 | +0.5 |
| No. 15 | 50 | 50 | +2.0 | +2.0 | +0.5 |
| (Comparative Example) | | | | | |
| No. 16 | 40 | 60 | +0.5 | +1.0 | +0.5 |
| No. 17 | 30 | 70 | 0 | +0.5 | +0.5 |

TABLE 2-continued

| Sample No. | Iron particles (parts by weight) | Ba—ferrite (parts by weight) | Recording/reproducing outputs | | Noise (dB) |
| --- | --- | --- | --- | --- | --- |
| | | | High frequency region (recorded wavelength, 0.6 μm) | Low frequency region (recorded wavelength, 5 μm) | |
| No. 18 | 0 | 100 | 0 | 0 | 0 |

As apparent from the above descriptions, magnetic recording media according to this invention are high-density magnetic recording media having large recording reproducing outputs over the entire frequency region from the high frequency region to the low frequency region and excellent anti-noise characteristics their industrial values are thus enormous.

We claim:

1. A magnetic recording medium comprising 5 to 100 parts by weight of hexagonal ferrite particles having an average particle diameter of 0.01 to 0.2 microns, and 100 parts by weight of ferromagnetic particles having a saturation magnetization of 70 to 220 emu/g and an average particle diameter within the range of 0.05 to 1 microns, said hexagonal ferrite particles and said ferromagnetic particles being dispersed in a single layer comprised of a resinous binder, wherein the said hexagonal ferrite particles have a coercive force (iHc) of from 600 to 2000 Oe, and said ferromagnetic particles have a coercive force (iHc) of from 300 to 2000 Oe.

2. The magnetic recording medium according to claim 1, wherein the average particle diameter of said hexagonal ferrite particles ranges from 0.05 to 0.1 μm.

3. The magnetic recording medium according to claim 1, wherein said hexagonal ferrite has a coercive force (iHc) of from 700 to 1500 Oe.

4. The magnetic recording medium according to claim 1, wherein said ferromagnetic particles are particles of γ-ferrite.

5. The magnetic recording medium according to claim 1, wherein the amount of said hexagonal ferrite particles ranges from 10 to 50 parts by weight.

6. The magnetic recording medium according to claim 1, wherein said hexagonal ferrite is selected from the group consisting of Ba-ferrite, Sr-ferrite, Ca-ferrite, Pb-ferrite and substituted Ba-ferrite represented by the following formula:

$$BaO.n[(Fe_{1-m}M_m)_2O_3]$$

wherein, M denotes at least one element selected from the group consisting of Co, Ti, Zn, Ni, Mn, In, Cu, Ge and Nb, and m and n stand respectively for values of 0 to 0.2 and 5.4 to 6.0.

7. The magnetic recording medium according to claim 6, wherein said hexagonal ferrite is Ba-ferrite or substituted Ba-ferrite.

8. The magnetic recording medium according to claim 1, wherein said ferromagnetic particles are particles of a metal selected from the group consisting of Fe, Ni, Co and Cr; particles of alloys made of two or more of Fe, Ni, Co and Cr; magnetite particles; γ-ferrite particles; Co-modified magnetite particles; and Co-modified γ-ferrite particles.

9. The magnetic recording medium according to claim 8, wherein said ferromagnetic particles have a saturation magnetization of 75 to 150 emu/g.

* * * * *